United States Patent
Butcher et al.

(10) Patent No.: US 7,685,149 B2
(45) Date of Patent: Mar. 23, 2010

(54) IDENTIFYING AND REMOVING POTENTIALLY UNWANTED SOFTWARE

(75) Inventors: Angela K. Butcher, Duvall, WA (US);
Jason Garms, Woodinville, WA (US);
Kalid M. Azad, Bellevue, WA (US);
Marc E. Seinfeld, Mid Levels (HK);
Paul J. Bryan, Kenmore, WA (US);
Sterling M. Reasor, Bellevue, WA (US);
Alvin Loh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 580 days.

(21) Appl. No.: 11/092,995

(22) Filed: Mar. 28, 2005

(65) Prior Publication Data

US 2006/0218145 A1  Sep. 28, 2006

(51) Int. Cl.
*G06F 17/00* (2006.01)
*G06F 15/173* (2006.01)
*G06F 11/32* (2006.01)

(52) U.S. Cl. .................. 707/102; 707/104.1; 709/223; 713/188; 726/23

(58) Field of Classification Search .................. 707/102
See application file for complete search history.

(56) References Cited

U.S. PATENT DOCUMENTS

| | | | | |
|---|---|---|---|---|
| 7,281,268 | B2 * | 10/2007 | Hollander et al. | 726/22 |
| 7,480,683 | B2 * | 1/2009 | Thomas et al. | 707/205 |
| 7,565,695 | B2 * | 7/2009 | Burtscher | 726/24 |
| 2002/0099952 | A1 | 7/2002 | Lambert et al. | |
| 2003/0037138 | A1 * | 2/2003 | Brown et al. | 709/225 |
| 2004/0034794 | A1 * | 2/2004 | Mayer et al. | 713/200 |
| 2004/0187023 | A1 * | 9/2004 | Alagna et al. | 713/200 |
| 2004/0230835 | A1 * | 11/2004 | Goldfeder et al. | 713/201 |
| 2004/0255137 | A1 * | 12/2004 | Ying | 713/193 |
| 2004/0266533 | A1 * | 12/2004 | Gentles et al. | 463/42 |
| 2005/0086510 | A1 * | 4/2005 | Nicodemus et al. | 713/200 |
| 2005/0132227 | A1 * | 6/2005 | Reasor et al. | 713/201 |
| 2005/0144241 | A1 * | 6/2005 | Stata et al. | 709/206 |
| 2005/0155031 | A1 * | 7/2005 | Wang et al. | 717/170 |

(Continued)

FOREIGN PATENT DOCUMENTS

WO  WO 2005/099340 A2  10/2005

OTHER PUBLICATIONS

Bleeping Computer: "How to Use the Microsoft AntiSpyware Beta to Remove Spyware" [online], Jan. 10, 2005, <http://www.bleepingcomputer.com/tutorials/tutorial98.html> [retrieved May 28, 2006], 12 pages.

(Continued)

*Primary Examiner*—Pierre M Vital
*Assistant Examiner*—Christopher P Nofal
(74) *Attorney, Agent, or Firm*—Workman Nydegger

(57) ABSTRACT

A system and method for identifying and removing potentially unwanted software. A mechanism is provided that identifies suspect programs to a user and allows the user to prevent the suspect programs from running without actually deleting them. In one embodiment, scanner data identifying potentially unwanted software is displayed in a GUI that allows the user to inhibit its continued execution. For example, any software not on a list of known, benign applications/processes may be identified as potentially unwanted. Similarly, software that displays one or more suspect behaviors may be so identified, allowing the user to distinguish between normal and suspect software without irreversibly altering the user's system.

20 Claims, 12 Drawing Sheets

U.S. PATENT DOCUMENTS

| | | | |
|---|---|---|---|
| 2005/0268112 A1* | 12/2005 | Wang et al. | 713/188 |
| 2006/0010241 A1* | 1/2006 | Kudallur et al. | 709/229 |
| 2006/0075499 A1* | 4/2006 | Edwards et al. | 726/24 |
| 2006/0136720 A1* | 6/2006 | Armstrong et al. | 713/164 |
| 2006/0149845 A1* | 7/2006 | Malin et al. | 709/228 |
| 2006/0253578 A1* | 11/2006 | Dixon et al. | 709/225 |
| 2006/0253584 A1* | 11/2006 | Dixon et al. | 709/225 |
| 2007/0006311 A1* | 1/2007 | Barton et al. | 726/24 |
| 2007/0038677 A1* | 2/2007 | Reasor et al. | 707/200 |
| 2007/0061242 A1* | 3/2007 | Ramer et al. | 705/37 |
| 2007/0061244 A1* | 3/2007 | Ramer et al. | 705/37 |
| 2007/0067297 A1* | 3/2007 | Kublickis | 707/9 |
| 2007/0168354 A1* | 7/2007 | Ramer et al. | 707/10 |
| 2007/0239724 A1* | 10/2007 | Ramer et al. | 707/10 |
| 2008/0127306 A1* | 5/2008 | Blumfield et al. | 726/3 |

OTHER PUBLICATIONS

Szerszen, D., "Whitelisting: Security's White Knight," [online] Credit Union Magazine.com, Dec. 2004, <http://www.creditunionmagazine.com/articles/200412_02.html> [retrieved May 29, 2006], 2 pp.

\* cited by examiner

IDENTIFYING AND REMOVING POTENTIALLY UNWANTED SOFTWARE

FIELD OF THE INVENTION

The embodiment of the present invention relates unwanted software, and more particularly, to a system and method for identifying and removing potentially unwanted software.

BACKGROUND OF THE INVENTION

It is estimated that four out of five users have unwanted software on their PCs. Many vendors have developed programs to remove these pieces of software. Typically, a collection of signatures is developed which represents each piece of unwanted software and the computer is searched for objects which match these signatures. The list of unwanted software is displayed to the user, and the user is given the option to remove and/or quarantine these objects. The problem with this approach is the need to develop an exact match for each piece of unwanted software which should be removed. This list of potentially unwanted software can grow indefinitely and needs constant updating. Moreover, at any given time there may be any number of entities developing and distributing potentially unwanted software, and it is difficult to install identifying signatures for each of them on every machine.

The embodiment of the present invention is directed to providing a system and method that overcome the foregoing and other disadvantages. More specifically, the present invention is directed to a system and method for identifying and removing unwanted software.

SUMMARY OF THE INVENTION

A system, method, and computer-readable media containing computer-executable instructions for identifying and removing unwanted software is provided. In accordance with one aspect of the invention, scanner data is promoted into a GUI for general application management to identify which specific software is potentially unwanted. When a specially formatted list of such software is presented visually and graphically to the user, the user can choose to stop these programs from running. The programs need not be deleted from the machine, but can instead be inhibited from running automatically, thus reducing their affect on the computer system.

In accordance with another aspect of the invention, metrics and heuristics are provided for how software is to be highlighted as potentially unwanted or generally suspicious. In one embodiment, an expansive "known list" of known applications and processes is provided, and anything which does not match this list is highlighted as potentially unwanted. This technique does not suffer from the infinite "list of potentially unwanted software" arms race because as new variants of potentially unwanted software are invented, they are highlighted as being potentially unwanted and are displayed for removal or for being disabled.

In accordance with another aspect of the invention, a list of characteristics is provided which identify potentially unwanted software. Running applications are monitored to see if they fall under these characteristics. For example, software which uses up protracted amounts of CPU time may be highlighted for the user in a list of potentially unwanted software.

In accordance with another aspect of the invention, when potentially unwanted software is removed from a user's system, the user is provided with the ability to restore the software. A simple UI is provided which gives the user enough data to make an informed trust decision.

In accordance with another aspect of the invention, a critical console view is provided to show the highest priority issues for identifying potentially unwanted software. The user may be provided with options for changing the priorities, and when the priorities are changed, a position or indicating mechanism may be adjusted (e.g., flopped) so as to show the new order of priorities. For example, when the first priority is reduced to a second priority, it may be shown that a new first priority has now been established as being in the first priority space. Unlike a traditional user interface which may strive to show menus in the same place, etc., the placement and UI/UX elements may be more associated with an organized/prioritized by severity, and not consistency of which column or tab stop shows what value (where a user would then have to look at the value and manually assess the relevance or severity). For example, memory, CPU, network CPU utilization, etc., may move around based on their current severity and be organized by priority, rather than data type. Even within the severity, the first priority item may be simply presented, or bolded/glowing if becoming even more risky, or flashing, beeping, etc., as increasing risk warrants. In other words, different levels of alarm can be shown depending on the current level of severity. Lower priorities (e.g., the fourth, fifth, or sixth priorities) may not be shown so as to avoid cluttering the view/thinking of the user, which might put the user more at risk if they were required to try to optimize the lower priorities (and thereby might ignore the more impending key risks). For example, CPU utilization might not be shown if relative to other things it is currently a less critical issue. All of these factors may be placed at the control of the user.

It will be appreciated that the embodiment of the present invention is advantageous in that it makes a user's system less opaque so that they can easily tell when the system has unwanted programs attached to system extensibility points. By putting the user in the loop and informing the user of what is "normal" for their PC and what is "not normal," the embodiment of the present invention empowers the user to understand what software is not expected and can be safely disabled. Instead of the user having to prove that a running process is not important and can be safely removed, the embodiment of the present invention asks the user to prove that an unidentified application is important, or else the default behavior is to disable the application in question. This approach thus places a natural check and balance on the almost unlimited extensibility of the computer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
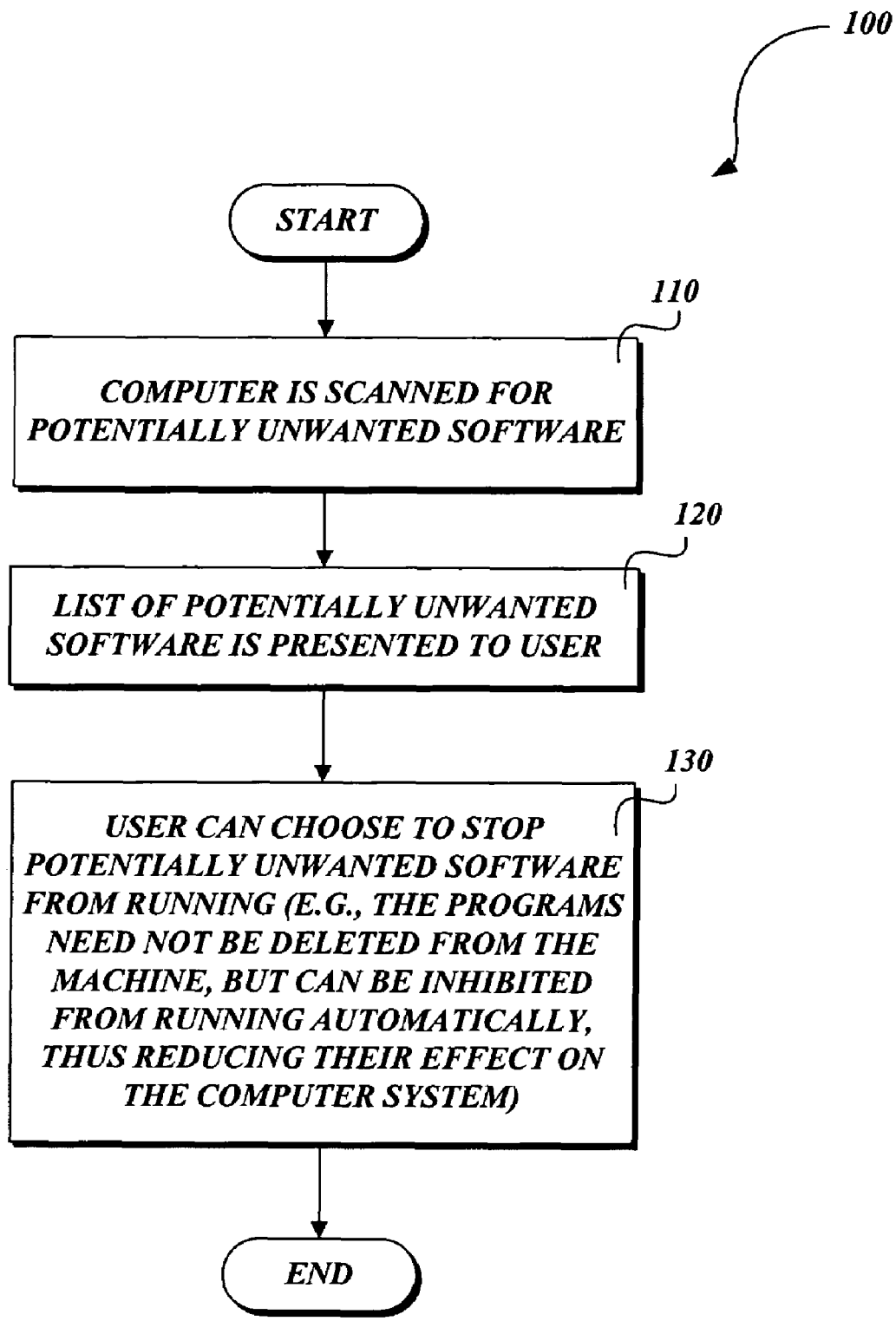
FIG. 1 is a flow diagram illustrative of a general routine for identifying potentially unwanted software in a computer system.

FIG. 1 is a flow diagram illustrative of a general routine 100 for identifying and inhibiting potentially unwanted software implementable as computer executable instructions stored on a computer-readable media. At a block 110, the computer is scanned for potentially unwanted software. At a block 120, a list of potentially unwanted software is presented to the user. In one embodiment, scanner data is promoted into a GUI for general application management with regard to which software is "potentially unwanted." At a block 130, the user can choose to stop the potentially unwanted software from running. The programs need not be deleted from the machine, but instead can be inhibited from running automatically, thus reducing their effect on the computer system.

Figure 2:
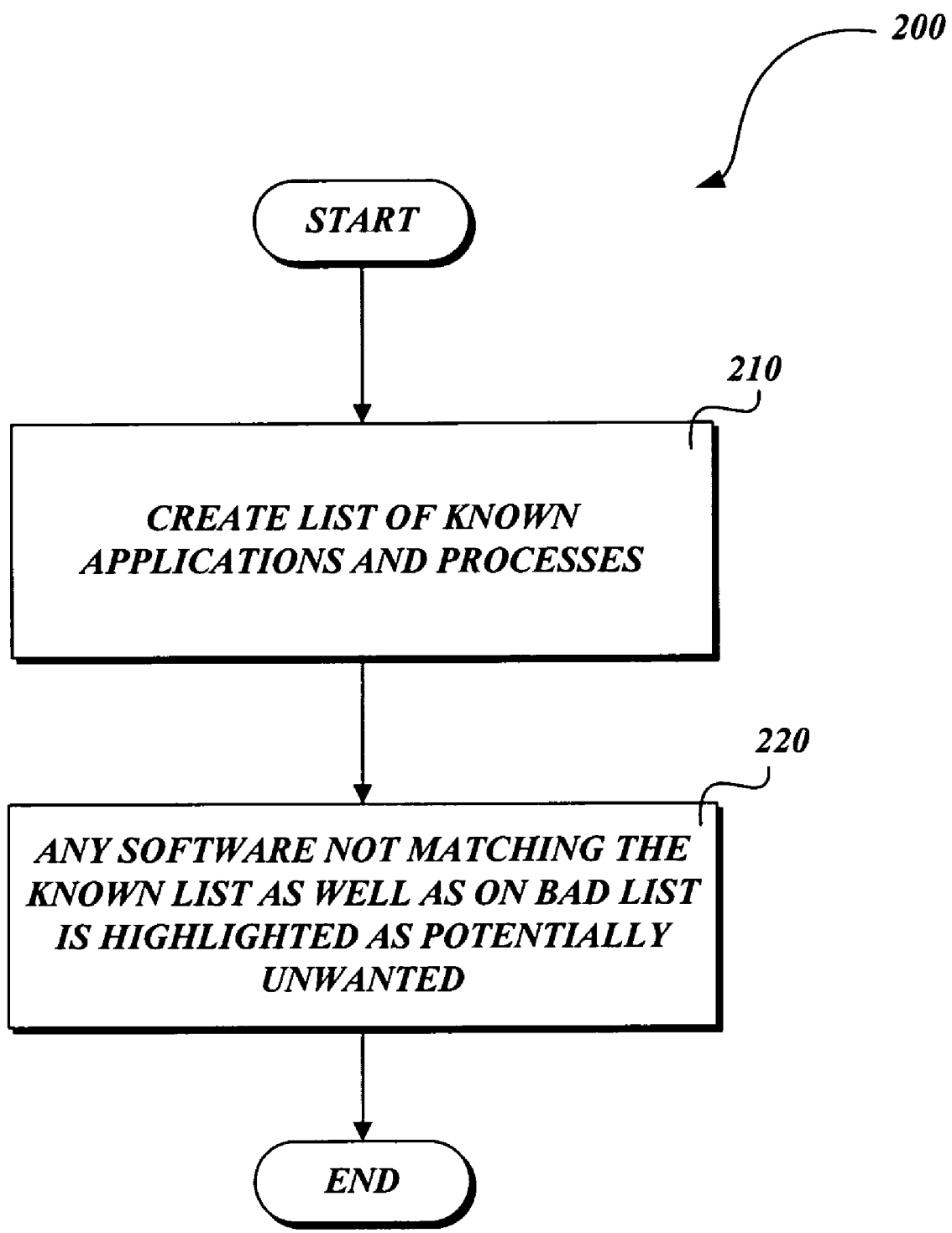
FIG. 2 is a flow diagram illustrative of a routine for creating a list of known applications.

FIG. 2 is a flow diagram illustrative of a routine 200 for highlighting selected software as potentially unwanted. There are many potential metrics and heuristics for how software can be highlighted as potentially unwanted or generally suspicious. As shown in FIG. 2, in one embodiment at a block 210, a list of known applications and processes is created. At a block 220, any software not matching the known list, as well as being on any type of bad list, is highlighted as potentially unwanted. It will be appreciated that this technique does not suffer from the infinite black list arms race because as new variants of spyware are invented, they will be highlighted as potentially unwanted and displayed for removal or being disabled.

Figure 3:
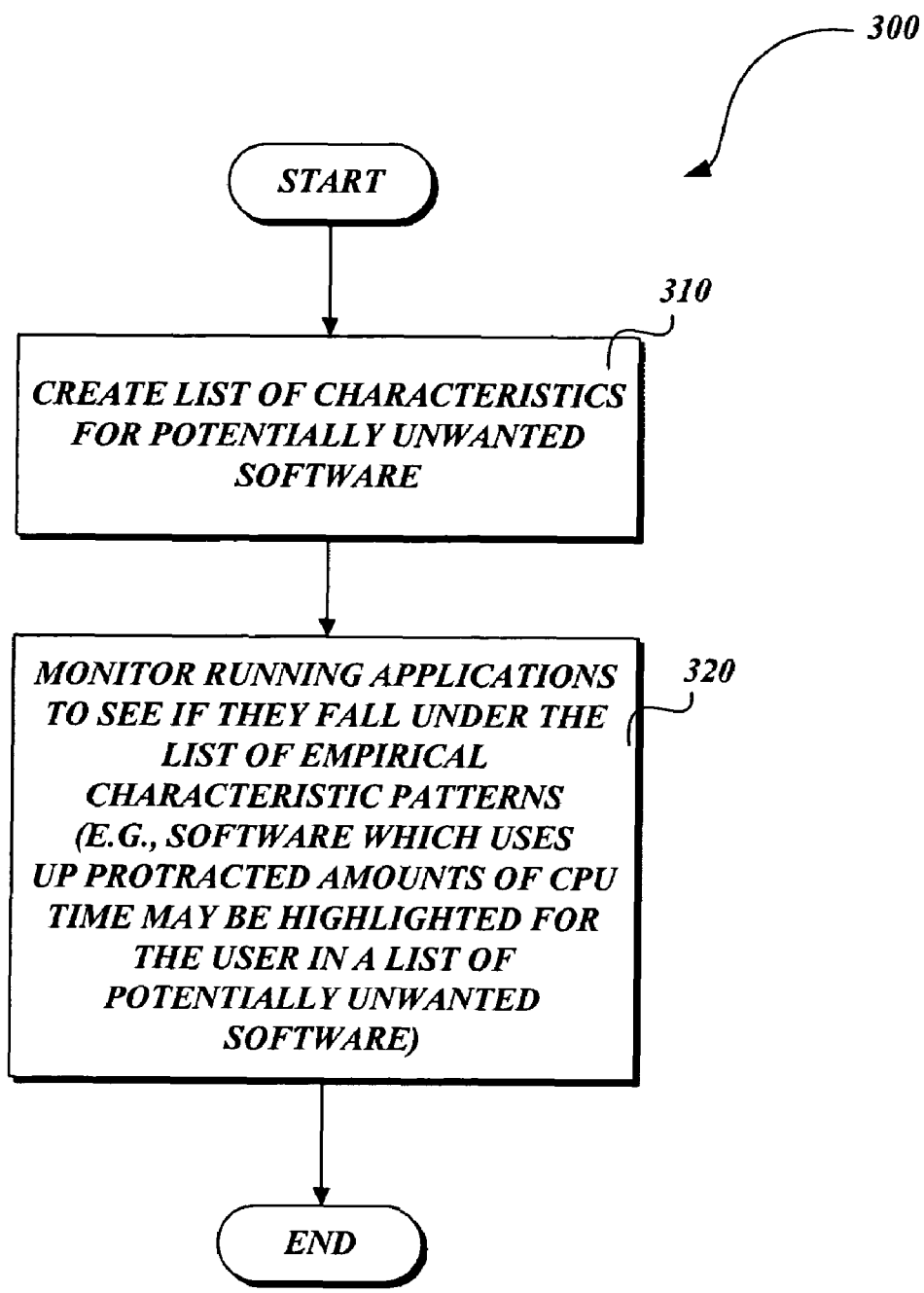
FIG. 3 is a flow diagram illustrative of a routine for creating a list of characteristics for identifying potentially unwanted software.

FIG. 3 is a flow diagram illustrative of a routine 300 for monitoring software for being potentially unwanted. At a block 310, a list of characteristics for potentially unwanted software is created. At a block 320, running applications are monitored to see if they fall under the list of empirical characteristic patterns. For example, software which uses protracted amounts of CPU time may be highlighted for the user in a list of potentially unwanted software.

Figure 4:
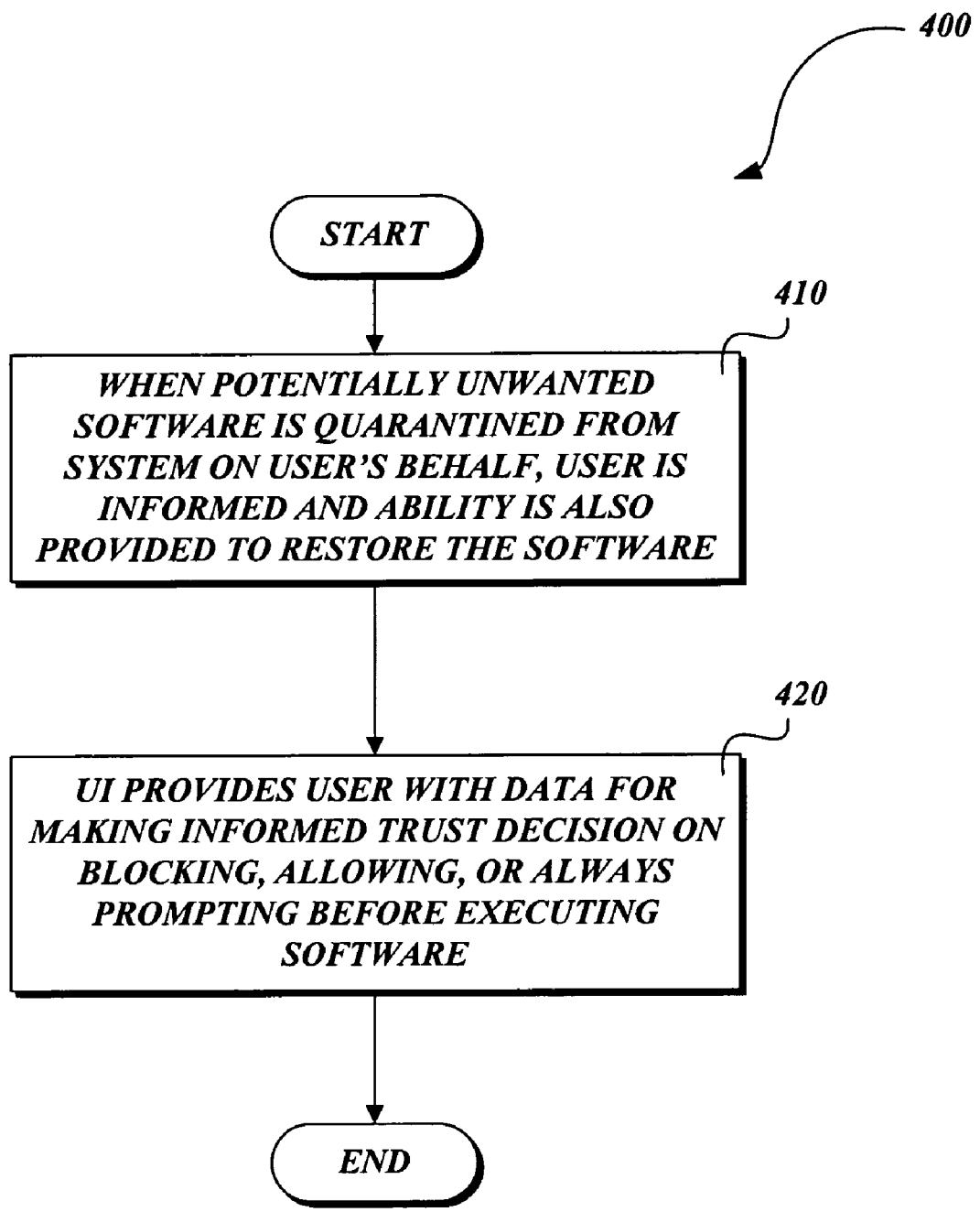
FIG. 4 is a flow diagram illustrative of a routine for providing a user with options for managing potentially unwanted software.

FIG. 4 is a flow diagram illustrative of a routine 400 for providing a user with options for managing potentially unwanted software. At a block 410, when potentially unwanted software is quarantined from the system on the user's behalf, the user is informed and the ability is provided for the user to restore the software. At a block 420, the user interface provides the user with data for making informed trust decisions on blocking, allowing, or always prompting before executing the software.

Figure 5A:
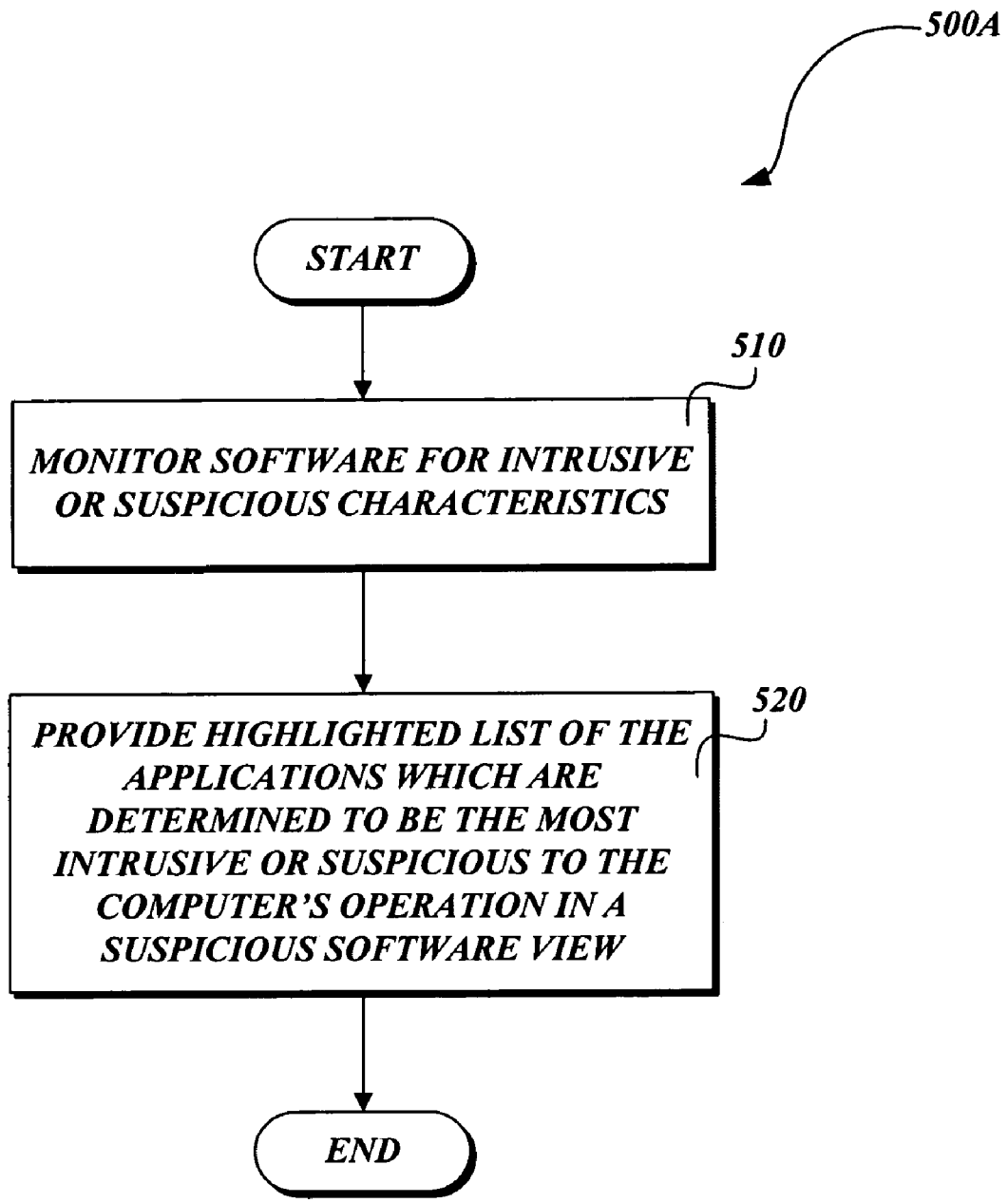
FIG. 5A is a flow diagram illustrative of a routine for monitoring software for intrusive or suspicious characteristics.

FIG. 5A is a flow diagram illustrative of a routine 500A for providing a highlighted list of suspicious software. At a block 510, software is monitored for intrusive or suspicious characteristics. At a block 520, a highlighted list is provided of the applications which are determined to be the most intrusive or suspicious to the computer's operation in a suspicious software view. In one embodiment, the intrusive or suspicious characteristics may be prioritized, as will be described in more detail below with respect to FIG. 5B.

Figure 5B:
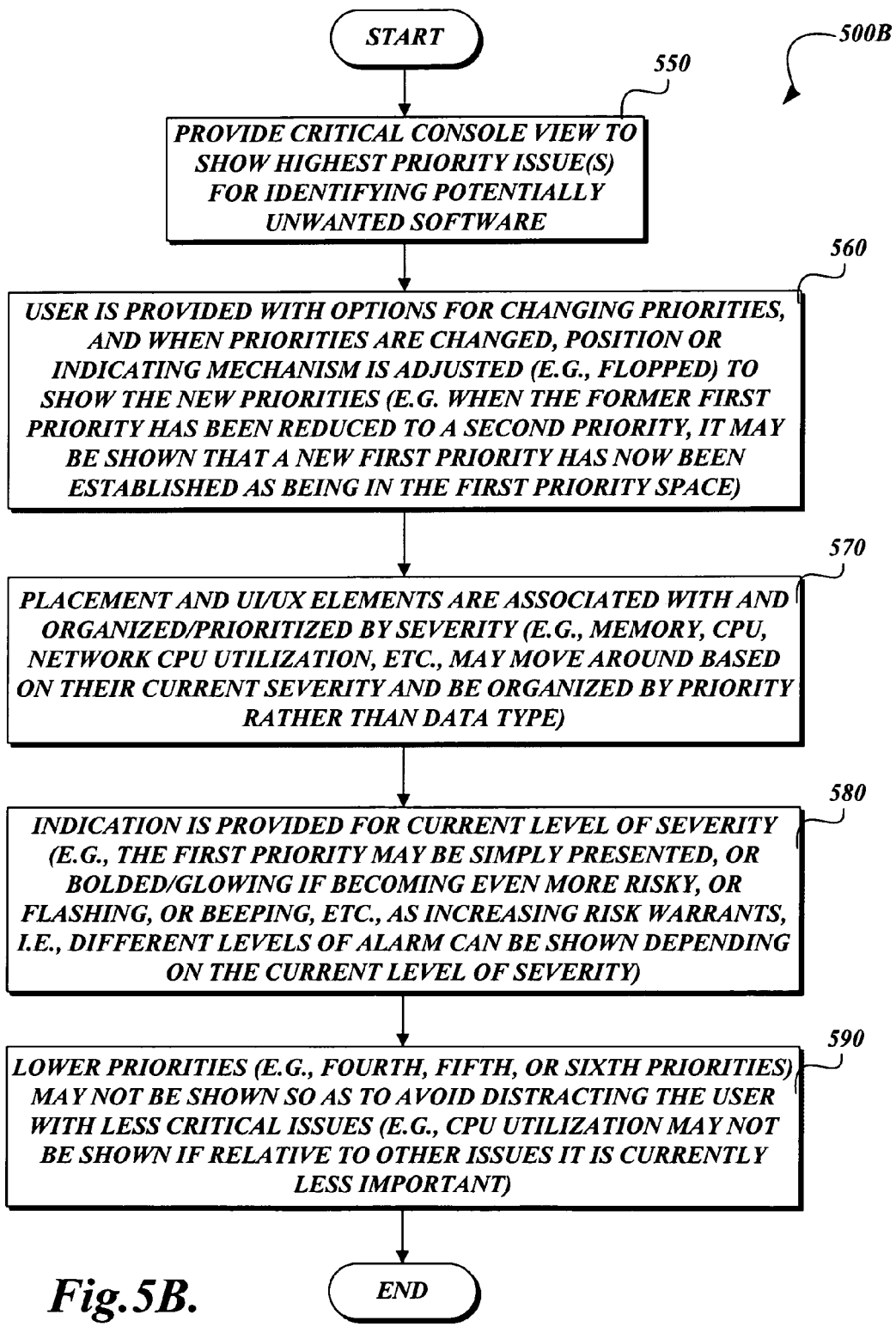
FIG. 5B is a flow diagram illustrative of a routine for a critical console view.

FIG. 5B is a flow diagram illustrative of a routine 500B for a critical console view. At a block 550, the highest priority issue(s) for identifying potentially unwanted software are shown. Under this type of system, many factors may be monitored, but only the top concerns may be shown that are the most critical if they are left unchecked and continue to increase in rate. As an example, in one embodiment, the first, second and third priorities may be shown.

At a block 560, the user is provided with options for changing the priorities for determining the most intrusive or suspicious software. When the priorities are changed, a position or indicating mechanism may be adjusted (e.g., flopped) so as to illustrate the new order of priorities. For example, when the former first priority has been reduced to a second priority, it may be shown that a new first priority has now been established as being in the first priority space.

At a block 570, the placement and UI/UX elements are associated with and organized/prioritized by severity, rather than consistency of which column or tab stop shows what value (where the user would then have to look at the value and manually assess the relevance or severity). For example, memory, CPU, network CPU utilization, etc., may move around based on their current severity, and be organized by priority, not by data type. It will be appreciated that this is unlike a traditional UI which might strive to show menus in the same place.

At a block 580, an indication is provided for current level of severity. For example, the first priority item may be simply presented, or bolded/glowing if becoming even more risky, or flashing, or beeping, etc., as increasing risk warrants. In other words, different levels of alarm can be indicated, depending on the current level of severity.

At a block 590, lower priorities (e.g., the fourth, fifth or sixth priorities) may not be shown so as to avoid distracting the user with less critical issues. In other words, it may be desirable to avoid cluttering the view/thinking and thereby putting the user more at risk if the user is required to try to deal with the lower priority issues, which may end up distracting the user from the more impending key risks. For example, CPU utilization may not be shown if it is currently less important than other issues. All of these factors may be placed at the control of the user.

Figure 6:
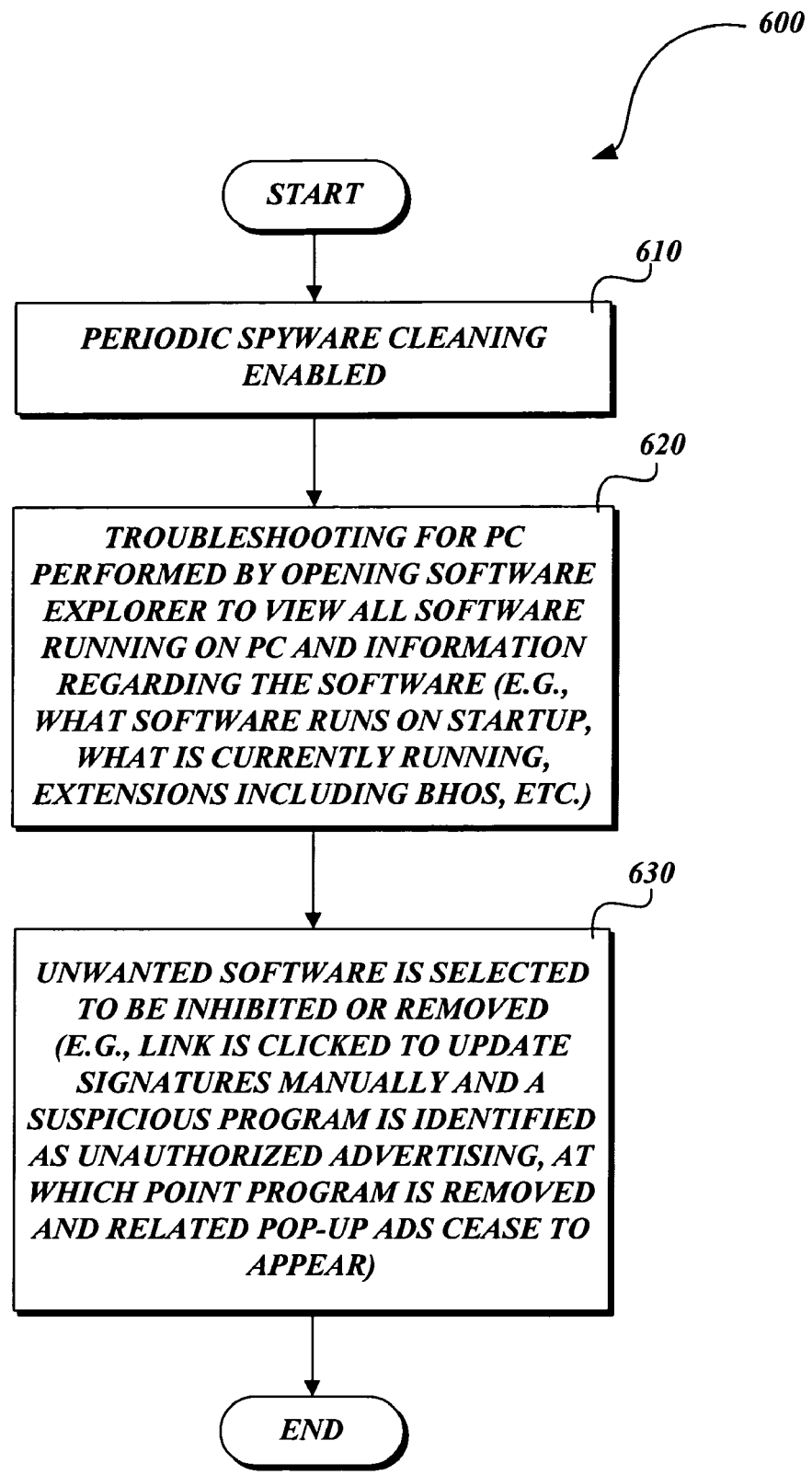
FIG. 6 is a flow diagram illustrative of a routine of a first example embodiment for periodic spyware cleaning.
Figure 7:
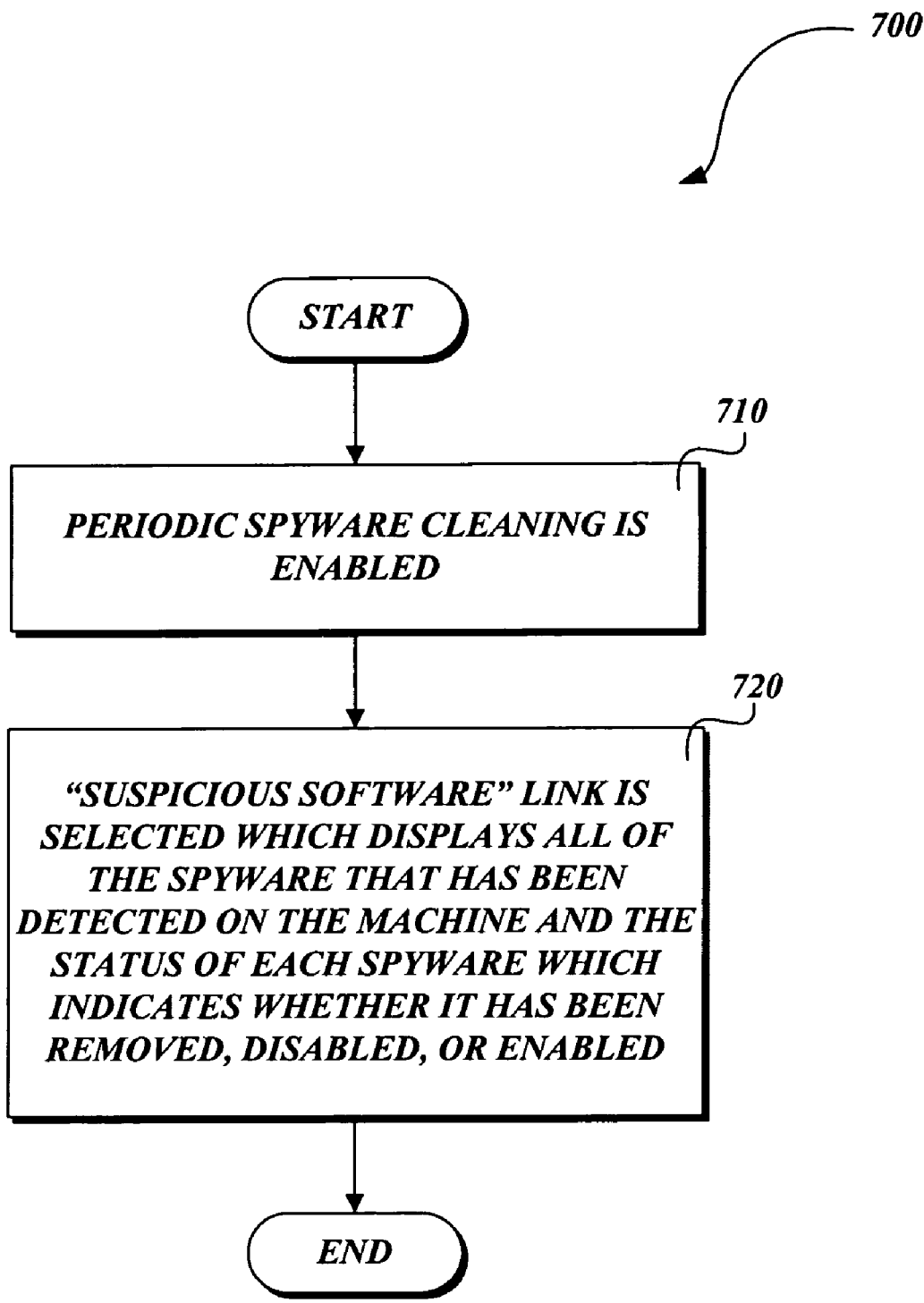
FIG. 7 is a flow diagram illustrative of a routine of a second example embodiment for periodic spyware cleaning.
Figure 8:
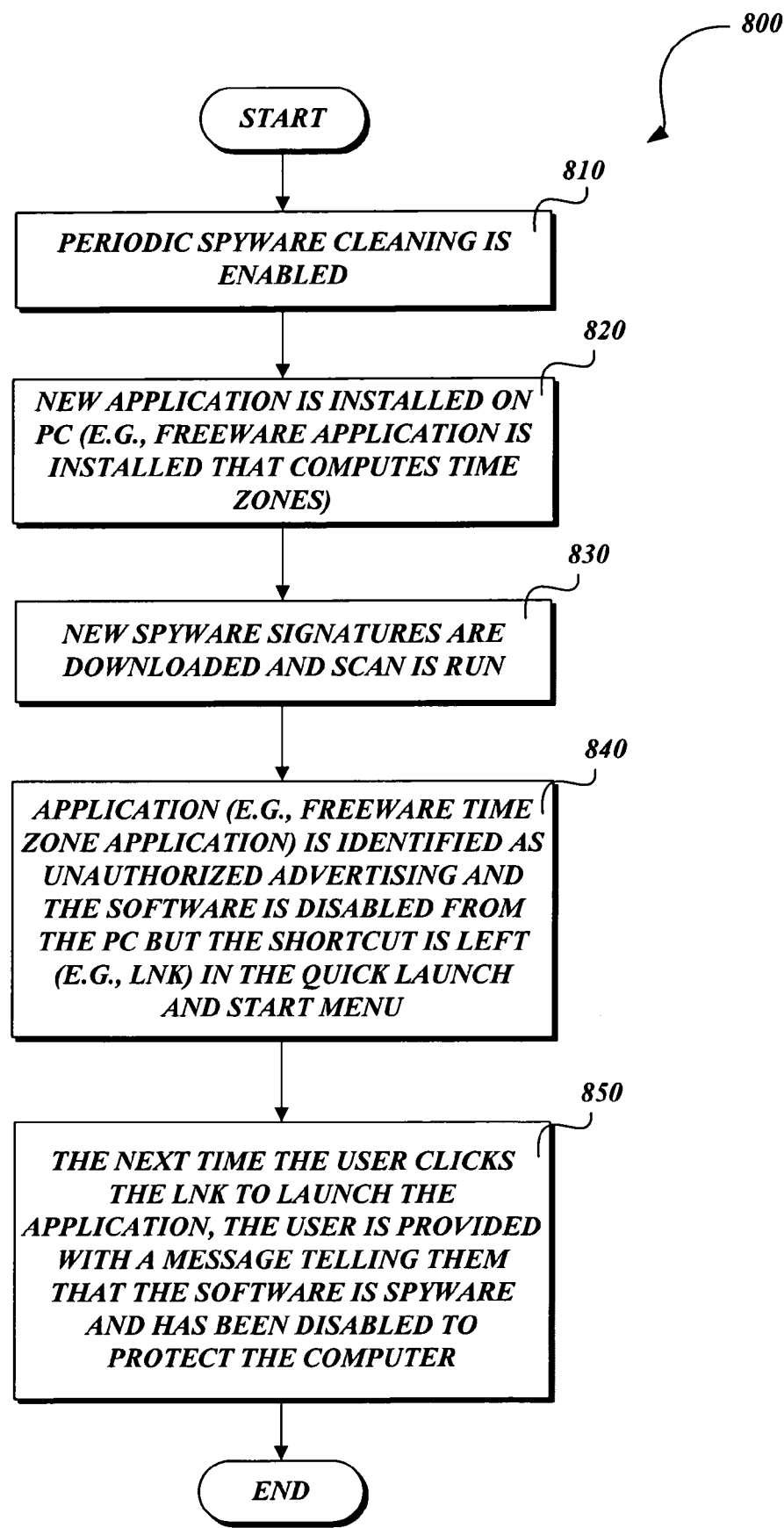
FIG. 8 is a flow diagram illustrative of a routine of a third example embodiment for periodic spyware cleaning.

FIGS. 6-8 provide examples of potential embodiments of periodic spyware cleaning, in accordance with the present invention. FIG. 6 is a flow diagram illustrative of a routine 600 of a first example embodiment of periodic spyware cleaning. At a block 610, a user has periodic spyware cleaning enabled. At a block 620, troubleshooting is performed by opening a software explorer to view all of the software running on the PC and information regarding the software. Using the software explorer, it can easily be determined what software runs on start up, what software is currently running, extensions, including BHOs, etc. At a block 630, the unwanted software is selected to be inhibited or removed. For example, a link may be clicked on to update the signatures manually, and a suspicious program may be identified as unauthorized advertising, at which point the program is removed and related pop-up ads cease to appear.

FIG. 7 is a flow diagram illustrative of a routine 700 showing a second example embodiment of periodic spyware cleaning. At a block 710, the user has periodic spyware cleaning enabled. At a block 720, the user's PC has been running fine, but he is curious to see what software has been removed or blocked on his behalf. The user selects a "suspicious software" link which displays all of the spyware that has been detected on the machine and the status of each spyware which indicates whether it has been removed, disabled, enabled, etc.

FIG. 8 is a flow diagram illustrative of a routine 800 of a third example embodiment of periodic spyware cleaning. At a block 810, a user has periodic spyware cleaning enabled. At a block 820, the user installs a new application on the user's PC. For example, the user may install a freeware application that computes time zones. At a block 830, new spyware signatures are downloaded and a scan is run. It will be appreciated that the downloading of the new spyware signatures may occur at any time (e.g., after a week). At a block 840, the application (e.g., the freeware time zone application) is identified as unauthorized advertising and the software is disabled from the PC, but the shortcut (e.g., LNK) is left in the quick launch and start menu. At a block 850, the next time the user clicks on the LNK to launch the application, the user is provided with a message telling them that the software has been identified as potential spyware and has been disabled to protect the computer.

Figure 9:
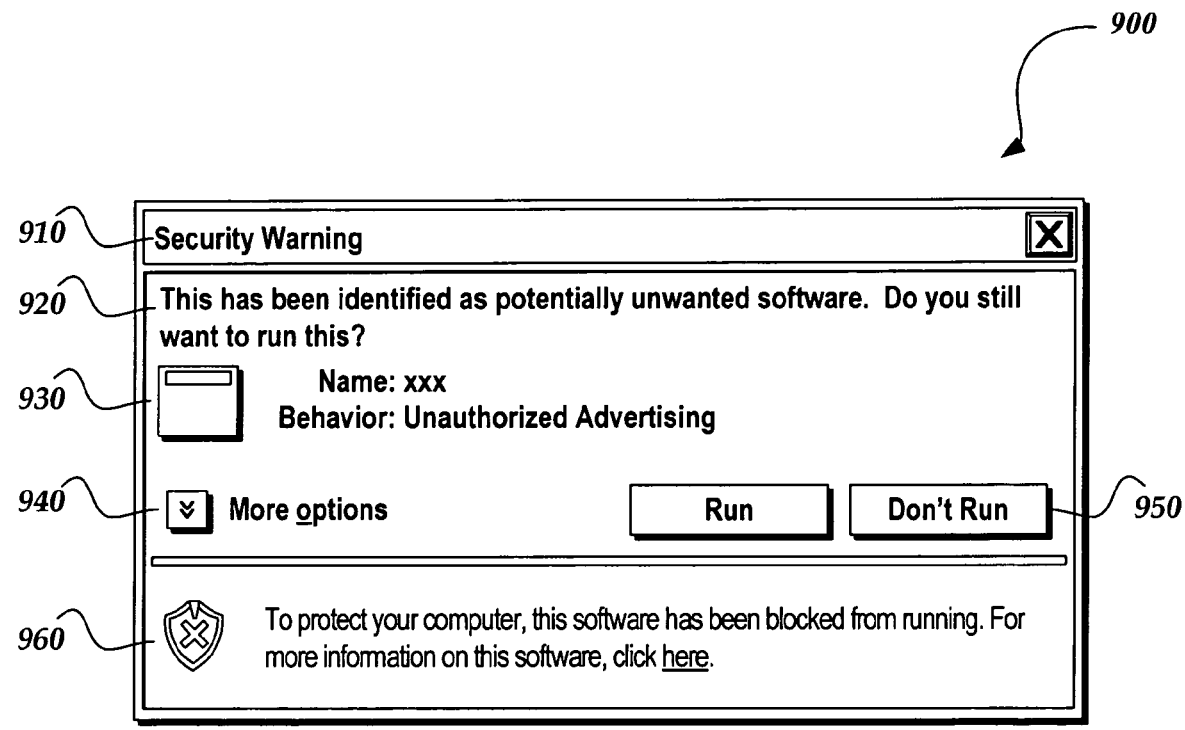
FIG. 9 is a diagram of a screen shot illustrating a user interface for a user to manage potentially unwanted software.

FIG. 9 is a diagram of a screen shot 900 illustrating a user interface for managing potentially unwanted software. At a screen area 910, an indication is provided that this is a "security warning." At a screen area 920, the user is informed "This has been identified as potentially unwanted software. Do you still want to run this?" At a screen area 930, the user is provided with the name of the potentially unwanted software, as well as the behavior, which, in this case, is "unauthorized advertising." At a screen area 940, a user is provided with a selection for "more options." At a screen area 950, the user is provided with the options for running or not running the potentially unwanted software. At a screen area 960, the user is provided with an indication that "To protect your computer, this software has been blocked from running. For more information on this software, click here."

Figure 10:
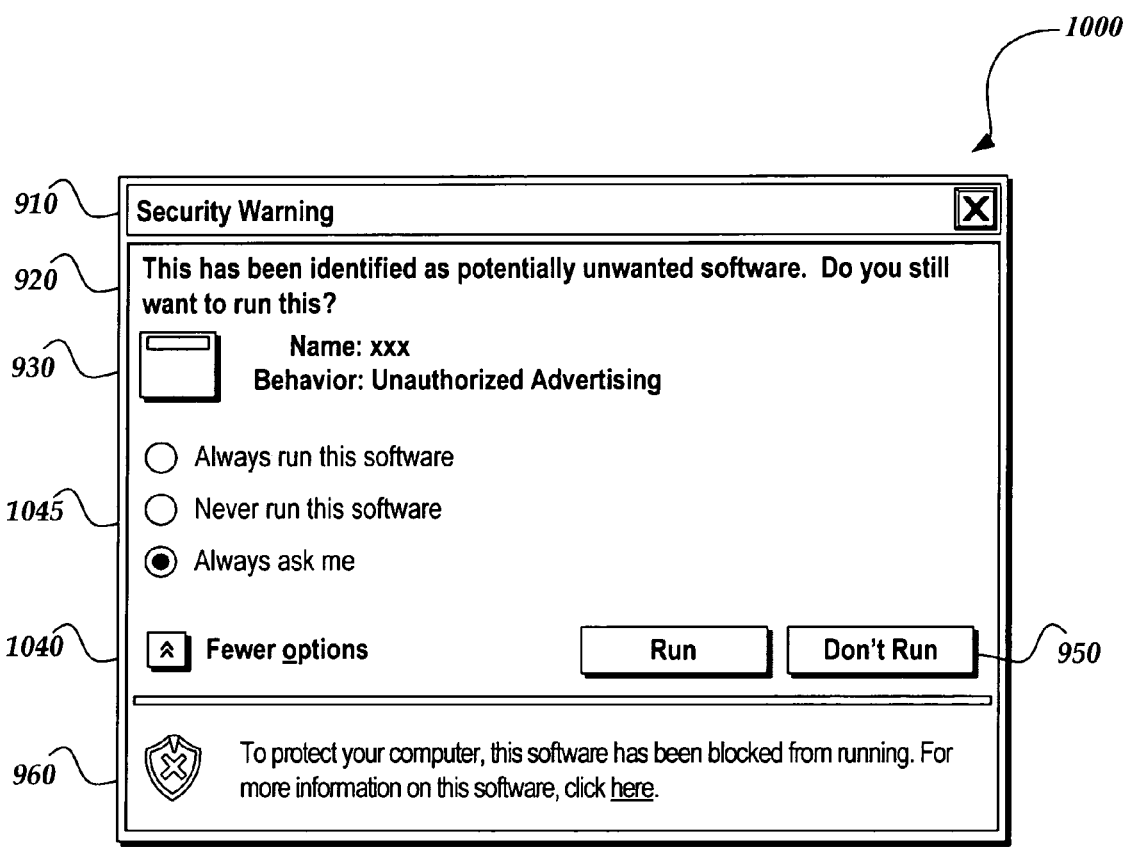
FIG. 10 is a diagram of the screen shot of FIG. 9 in which additional options have been selected.

FIG. 10 is a diagram of a screen shot 1000 in which the user interface of FIG. 9 has had the "more options" selection made from the screen area 940. As shown in FIG. 10, in a screen area 1040, a user is provided with a "fewer options" selection. In a screen area 1045, a user is provided with options for "always ask me"; "never run this software"; or "always run this software." Through these options, a user is able to review and manage potentially unwanted software.

Figure 11:
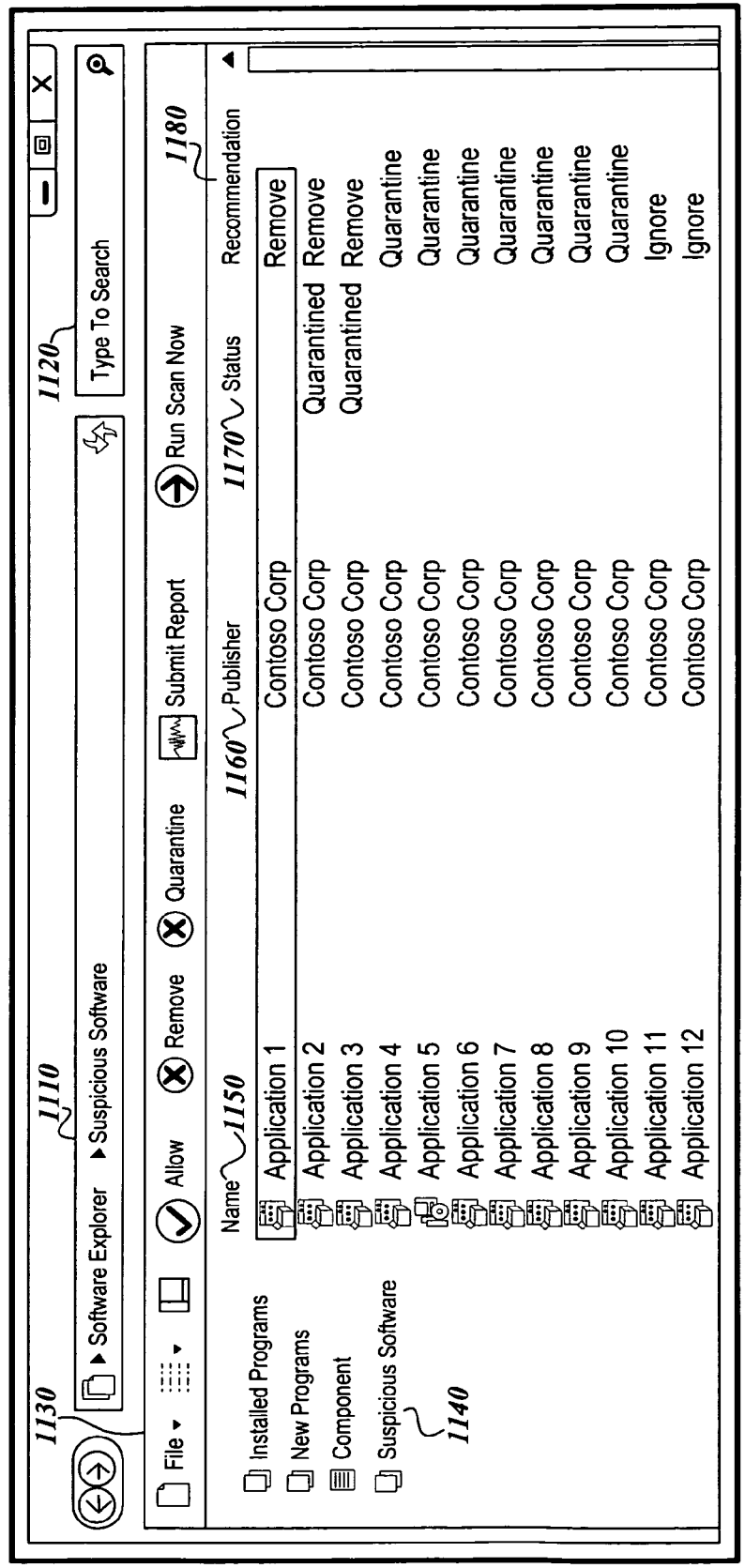
FIG. 11 is a diagram of a screen shot illustrating a suspicious software view.

FIG. 11 is a diagram of a screen shot 1100 of a suspicious software view. At a screen area 1110, indications are provided for "software explorer" and "suspicious software." At a screen area 1120, a search option is provided for a user to "type to search." At a screen area 1130, options are provided for "file," "allow," "remove," "quarantine," "submit report," and "run scan now." At a screen area 1140, options are provided for "installed programs," "new programs," "component," and "suspicious software."

At a screen area 1150, a name column is provided, which includes applications 1-12. At a screen area 1160, a publisher column is provided, which includes the names of the publishers of the various applications, which in this case is Contoso Corp. for all of the applications. At a screen area 1170, a status column is provided, which shows a status of "quarantined" for the applications 2 and 3. At a screen area 1180, a recommendation column is provided, which shows recommendations of "remove" for applications 1-3, "quarantine" for applications 4-10, and "ignore" for applications 11-12.

It will be appreciated that the embodiment of the present invention has a number of advantages. By putting the user in the loop and informing the user what is "normal" for their PC and what is "not normal," the embodiment of the present invention empowers the user to understand what software is not expected and can be safely disabled. Instead of the user having to prove that a running process is not important and can be safely removed, the embodiment of the present invention asks the user to prove that an unidentified application is important, otherwise the default behavior of the system is to disable the application in question. This approach places a natural "check and balance" on the almost unlimited extensibility of the computer.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for identifying and managing unwanted programs on a computer system, the method comprising:
   automatically creating on a computer system a list of known user desired programs, wherein the known user desired programs are specified by a user, and include software applications previously installed and utilized by the user of the computer system;
   identifying one or more potentially unwanted programs by monitoring each of the programs running on the computer system to determine whether each running program satisfies a set of empirical characteristic patterns, wherein at least one empirical characteristic pattern indicates a measure of protracted amounts of processor time for programs running on the computer system, wherein a running program that is not on the list of known user desired programs and that exhibits an increase in a rate of protracted processor time use is identified as a potentially unwanted program;
   designating a current severity rating for each potentially unwanted program that is identified, wherein the current severity ratings indicate those potentially unwanted programs that are currently the most intrusive or most suspicious to the computer system's operations, wherein the current severity ratings reflect a user's prioritization of metrics that include the potentially unwanted programs' memory utilization, network utilization, and network processor utilization;
   displaying a list of potentially unwanted programs in accordance with the current severity ratings and the user's prioritization of metrics, wherein the list comprises a status of each potentially unwanted program and a recommended action for the user to take for each potentially unwanted program;
   prompting the user to allow each potentially unwanted program to run or to be prohibited from running; and
   automatically updating the list of potentially unwanted programs as a result of changes to the metrics, the prioritization of the metrics, and the status.

2. The method of claim 1, wherein the identified programs not on the list of known user desired programs are presented to a user via a user interface configured to identify and manage at least one program.

3. The method of claim 1, wherein the identified programs not on the list of known user desired programs are quarantined and an option to restore any identified program not on the list of known user desired programs is presented to a user.

4. The method of claim 1, wherein the identified programs not on the list of known user desired programs and options, including blocking, allowing, or requesting a prompt before executing programs not on the list of known user desired programs, are presented to a user.

5. The method of claim 1, wherein a list of characteristics is utilized to identify programs not on the list of known user desired programs.

6. The method of claim 5, wherein a ranked list of at least two programs not on the list of known user desired programs are presented to the user.

7. The method of claim 1, wherein a list of known undesired programs is used to identify programs not on the list of known user desired programs.

8. Computer-readable storage media comprising executable instructions that perform the steps of:
   automatically creating on a computer system a list of known user desired programs, wherein the known user desired programs are specified by a user, and include software applications previously installed and utilized by the user of the computer system;
   identifying one or more potentially unwanted programs by monitoring each of the programs running on the computer system to determine whether each running program satisfies a set of empirical characteristic patterns, wherein at least one empirical characteristic pattern indicates a measure of protracted amounts of processor time for programs running on the computer system, wherein a running program that is not on the list of known user desired programs and that exhibits an increase in a rate of protracted processor time use is identified as a potentially unwanted program;
   designating a current severity rating for each potentially unwanted program that is identified, wherein the current severity ratings indicate those potentially unwanted programs that are currently the most intrusive or most suspicious to the computer system's operations, wherein the current severity ratings reflect a user's prioritization of metrics that include the potentially unwanted programs' memory utilization, network utilization, and network processor utilization;
   displaying a list of potentially unwanted programs in accordance with the current severity ratings and the user's prioritization of metrics, wherein the list comprises a status of each potentially unwanted program and a recommended action for the user to take for each potentially unwanted program;
   prompting the user to allow each potentially unwanted program to run or to be prohibited from running; and
   automatically updating the list of potentially unwanted programs as a result of changes to the metrics, the prioritization of the metrics, and the status.

9. The computer-readable storage media of claim 8, wherein a list of characteristics for unwanted programs is utilized for identifying unwanted programs.

10. The computer-readable storage media of claim 9, wherein a ranked list of at least some of the unwanted programs is displayed.

11. The computer-readable storage media of claim 10, wherein the ranked list is ranked based on selected behaviors.

12. The computer-readable storage media of claim 8, wherein unwanted programs are quarantined and an option to restore any program is displayed.

13. The computer-readable storage media of claim 8, wherein the options include blocking, allowing, or requesting a prompt before executing the related unwanted program.

14. A computer system comprising a memory and processor configured to perform the following:
   automatically creating on a computer system a list of known user desired programs, wherein the known user desired programs are specified by a user, and include software applications previously installed and utilized by the user of the computer system;
   identifying one or more potentially unwanted programs by monitoring each of the programs running on the computer system to determine whether each running program satisfies a set of empirical characteristic patterns, wherein at least one empirical characteristic pattern indicates a measure of protracted amounts of processor time for programs running on the computer system, wherein a running program that is not on the list of known user desired programs and that exhibits an increase in a rate of protracted processor time use is identified as a potentially unwanted program;
   designating a current severity rating for each potentially unwanted program that is identified, wherein the current severity ratings indicate those potentially unwanted programs that are currently the most intrusive or most suspicious to the computer system's operations, wherein the current severity ratings reflect a user's prioritization of metrics that include the potentially unwanted programs' memory utilization, network utilization, and network processor utilization;
   displaying a list of potentially unwanted programs in accordance with the current severity ratings and the user's prioritization of metrics, wherein the list comprises a status of each potentially unwanted program and a recommended action for the user to take for each potentially unwanted program;
   prompting the user to allow each potentially unwanted program to run or to be prohibited from running; and
   automatically updating the list of potentially unwanted programs as a result of changes to the metrics, the prioritization of the metrics, and the status.

15. The computer system of claim 14, wherein when the displayed characteristics are changed, the change is indicated by an indicating mechanism.

16. The computer system of claim 14, wherein the level of severity is depicted on the display in an organized manner based on the level of severity of the blocked, potentially unwanted programs.

17. The computer system of claim 14, wherein different levels of alarm are indicated depending on current levels of severity.

18. The computer system of claim 14, wherein one or more characteristics are not shown.

19. The computer system of claim 16, wherein the organized manner is the placement of user interface elements on the display denotes the current level of severity.

20. The computer system of claim 19 wherein the organized manner is the application of a user attention getting indicator to the characteristics that identify blocked, potentially unwanted programs with high levels of severity.

* * * * *

UNITED STATES PATENT AND TRADEMARK OFFICE
CERTIFICATE OF CORRECTION

| | | |
|---|---|---|
| PATENT NO. | : 7,685,149 B2 | Page 1 of 1 |
| APPLICATION NO. | : 11/092995 | |
| DATED | : March 23, 2010 | |
| INVENTOR(S) | : Angela K. Butcher et al. | |

It is certified that error appears in the above-identified patent and that said Letters Patent is hereby corrected as shown below:

In column 8, line 58, in Claim 20, delete "claim 19" and insert -- claim 16 --, therefor.

Signed and Sealed this
Twenty-fifth Day of January, 2011

David J. Kappos
*Director of the United States Patent and Trademark Office*